(12) United States Patent
Salter et al.

(10) Patent No.: US 11,999,232 B2
(45) Date of Patent: Jun. 4, 2024

(54) VEHICLE HAVING PET MONITORING AND RELATED CONTROLS

(71) Applicant: Ford Global Technologies, LLC, Dearborn, MI (US)

(72) Inventors: Stuart C. Salter, White Lake, MI (US); Hussein H. Berry, Dearborn, MI (US); Annette Lynn Huebner, Highland, MI (US); Marguerite Lynn Kimball, Brighton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 481 days.

(21) Appl. No.: 17/124,886

(22) Filed: Dec. 17, 2020

(65) Prior Publication Data

US 2022/0194228 A1  Jun. 23, 2022

(51) Int. Cl.
| | | |
|---|---|---|
| *B60K 35/00* | (2024.01) | |
| *A01K 11/00* | (2006.01) | |
| *A01K 29/00* | (2006.01) | |
| *B60H 1/00* | (2006.01) | |
| *B60N 2/56* | (2006.01) | |
| *E05F 15/73* | (2015.01) | |
| *B60K 35/22* | (2024.01) | |

(52) U.S. Cl.
CPC ............ *B60K 35/00* (2013.01); *A01K 11/006* (2013.01); *A01K 29/005* (2013.01); *B60H 1/00357* (2013.01); *B60N 2/56* (2013.01); *E05F 15/73* (2015.01); *B60K 35/22* (2024.01); *E05Y 2400/44* (2013.01); *E05Y 2400/52* (2013.01); *E05Y 2900/55* (2013.01)

(58) Field of Classification Search
CPC ...... A01K 11/06; A01K 29/005; B60K 35/00; B60K 2370/152; B60K 2370/1523; B60K 2370/164; B60K 2370/183; B60K 2370/48; E05F 15/73; E05Y 2400/44; E05Y 2400/52; E05Y 2900/55; B60H 1/00357; B60H 1/00742; B60H 1/00978
See application file for complete search history.

(56) References Cited

U.S. PATENT DOCUMENTS

| | | | |
|---|---|---|---|
| 5,724,920 | A | 3/1998 | Meisman et al. |
| 7,527,017 | B1 | 5/2009 | Cribb |
| 7,600,486 | B2 | 10/2009 | Ellis |
| 8,100,084 | B1 | 1/2012 | Abramson |
| 8,117,991 | B1 | 2/2012 | Civitillo |

(Continued)

FOREIGN PATENT DOCUMENTS

| | | |
|---|---|---|
| CN | 109839929 A | 6/2019 |
| JP | 2006219009 A | 8/2006 |

*Primary Examiner* — Mussa A Shaawat
(74) *Attorney, Agent, or Firm* — Vichit Chea; Price Heneveld LLP (57) ABSTRACT

A vehicle is provided that includes a vehicle body, a plurality of RF signal receivers located at a plurality of locations within the vehicle, an RF signal transmitter configured to be located on a pet for transmitting an RF signal, and a controller for processing the RF signal received by each of the plurality of RF signal receivers and determining a location of the pet based on the received RF signals, wherein the controller generates an output based on the location of the pet and controls at least one vehicle function based on the output.

20 Claims, 4 Drawing Sheets

(56) References Cited

U.S. PATENT DOCUMENTS

| | | | |
|---|---|---|---|
| 8,146,534 B1 | 4/2012 | Robertson | |
| 8,258,932 B2 * | 9/2012 | Wahlstrom | G08B 13/1681 |
| | | | 340/444 |
| 8,768,292 B2 | 7/2014 | Welch | |
| 9,227,484 B1 * | 1/2016 | Justice | B60H 1/00778 |
| 9,392,770 B2 | 7/2016 | Almeida | |
| 9,463,805 B2 | 10/2016 | Kirsch et al. | |
| 9,637,085 B2 | 5/2017 | Sanchez Huipio et al. | |
| 9,654,103 B2 | 5/2017 | Buttolo et al. | |
| 9,845,050 B1 | 12/2017 | Garza et al. | |
| 9,975,481 B2 * | 5/2018 | Hatton | B60Q 5/006 |
| 10,091,972 B1 | 10/2018 | Jensen et al. | |
| 10,115,029 B1 * | 10/2018 | Day | G06V 20/59 |
| 10,303,961 B1 | 5/2019 | Stoffel et al. | |
| 10,352,759 B1 | 7/2019 | Jensen | |
| 10,649,061 B2 | 5/2020 | Bjorkengren | |
| 10,742,969 B1 | 8/2020 | Rohatgi et al. | |
| 10,785,604 B1 | 9/2020 | Kumar et al. | |
| 11,067,452 B1 | 7/2021 | Lee et al. | |
| 11,562,550 B1 * | 1/2023 | Asghar | G06T 19/20 |
| 2002/0169583 A1 * | 11/2002 | Gutta | G08B 21/0476 |
| | | | 702/188 |
| 2007/0131177 A1 | 6/2007 | Perkitny | |
| 2008/0246318 A1 | 10/2008 | Bothe et al. | |
| 2010/0305816 A1 * | 12/2010 | Orlewski | B60R 21/01526 |
| | | | 701/45 |
| 2013/0285815 A1 * | 10/2013 | Jones, II | A01K 11/008 |
| | | | 340/573.3 |
| 2014/0309806 A1 * | 10/2014 | Ricci | G05D 23/1917 |
| | | | 701/1 |
| 2014/0309862 A1 * | 10/2014 | Ricci | B60R 16/037 |
| | | | 701/36 |
| 2014/0310739 A1 * | 10/2014 | Ricci | G06Q 20/321 |
| | | | 725/75 |
| 2014/0319895 A1 | 10/2014 | Lange-Mao et al. | |
| 2015/0342143 A1 | 12/2015 | Stewart | |
| 2016/0070527 A1 * | 3/2016 | Ricci | G06Q 10/109 |
| | | | 715/716 |
| 2016/0227732 A1 | 8/2016 | Pompey | |
| 2016/0272112 A1 * | 9/2016 | DeGrazia | B60Q 9/00 |
| 2016/0357262 A1 * | 12/2016 | Ansari | G08G 1/143 |
| 2018/0194194 A1 * | 7/2018 | Lyubich | B60H 1/00742 |
| 2019/0016235 A1 | 1/2019 | Parida et al. | |
| 2019/0118603 A1 * | 4/2019 | Feit | B60G 11/27 |
| 2019/0279447 A1 * | 9/2019 | Ricci | A61B 5/4809 |
| 2019/0389352 A1 | 12/2019 | Koller et al. | |
| 2020/0062080 A1 * | 2/2020 | Hernandez | B60H 1/00978 |
| 2020/0085004 A1 | 3/2020 | Yoo et al. | |
| 2020/0130702 A1 * | 4/2020 | Ferreira | B60W 10/30 |
| 2020/0307483 A1 | 10/2020 | Topf et al. | |
| 2020/0383580 A1 | 12/2020 | Shouldice et al. | |
| 2021/0232642 A1 * | 7/2021 | Ricci | G06F 9/451 |
| 2022/0112760 A1 * | 4/2022 | Demele | E05B 63/185 |
| 2023/0106673 A1 * | 4/2023 | Asghar | G06V 20/597 |
| | | | 382/104 |
| 2023/0230121 A1 | 7/2023 | Chintakindi et al. | |

* cited by examiner

VEHICLE HAVING PET MONITORING AND RELATED CONTROLS

FIELD OF THE DISCLOSURE

The present disclosure generally relates to transport vehicles, and more particularly relates to a vehicle that monitors a pet in the vehicle and controls one or more pet related functions.

BACKGROUND OF THE DISCLOSURE

Automotive vehicles are commonly used to transport pets such as dogs, cats and other animals. When traveling in a vehicle, particularly on long trips, a pet may be accommodated by manually controlling windows, vehicle seats, and heating, ventilation and cooling (HVAC) devices, for example. It may be desirable to provide for enhanced controls relating to a pet, particularly when transported within a vehicle.

SUMMARY OF THE DISCLOSURE

According to a first aspect of the present disclosure, a vehicle is provided. The vehicle includes a vehicle body, a plurality of RF signal receivers located at a plurality of locations on the vehicle, an RF signal transmitter configured to be located on a pet for transmitting an RF signal, and a controller for processing the RF signal received by each of the plurality of RF signal receivers and determining a location of the pet based on the received RF signal from each of the plurality of RF signal receivers.

Embodiments of the first aspect of the disclosure can include any one or a combination of the following features:
 the controller controls at least one vehicle function based on the sensed location of the pet;
 the controller controls a video display based on an identified location of a pet positioned proximate to the video display;
 the controller changes a characteristic of the video display;
 the characteristic comprises a video frame rate;
 the characteristic comprises color presented on images on the display;
 the controller controls one or more windows of the vehicle based on the location of the pet;
 the controller controls one or more heated and/or cooled seats to heat and/or cool the one or more seats based on the location of the pet;
 the controller controls airflow within the vehicle from an air duct based on location of the pet;
 the controller controls one or more blowers to control the airflow in the air duct; and
 the controller controls ambient temperature in the vehicle based on a sensed temperature of the pet.

According to a second aspect of the present disclosure, a vehicle is provided. The vehicle includes a vehicle body, a plurality of RF signal receivers located at a plurality of locations on the vehicle, an RF signal transmitter configured to be located on a pet for transmitting an RF signal, and a controller for processing the RF signal received by each of the plurality of RF signal receivers and determining a location of the pet based on the received RF signal from each of the plurality of RF signal receivers, wherein the controller generates an output based on the location of the pet and controls at least one vehicle related function based on the output.

Embodiments of the second aspect of the disclosure can include any one or a combination of the following features:
 the controller controls a video display based on an identified location of a pet positioned proximate to the video display;
 the controller changes a characteristic of the video display;
 the characteristic comprises a video frame rate;
 the characteristic comprises color of images presented on the display;
 the controller controls one or more windows of the vehicle based on the location of the pet;
 the controller processes the RF signal received from each of the plurality of the RF signal receivers and performs triangulation to determine the location of the pet; and
 the RF signal transmitter comprises a low energy wireless RF signal.

According to a third aspect of the invention, a vehicle is provided that includes a vehicle body, a plurality of first RF signal transceivers located at a plurality of locations on the vehicle for transmitting and receiving RF signals, a second RF signal transceiver configured to be located on a pet for transmitting and receiving RF signals, and a controller for processing the RF signals received by the plurality of first RF signal transceivers and the second RF signal transceiver and determining a location of the pet based on the received RF signals.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
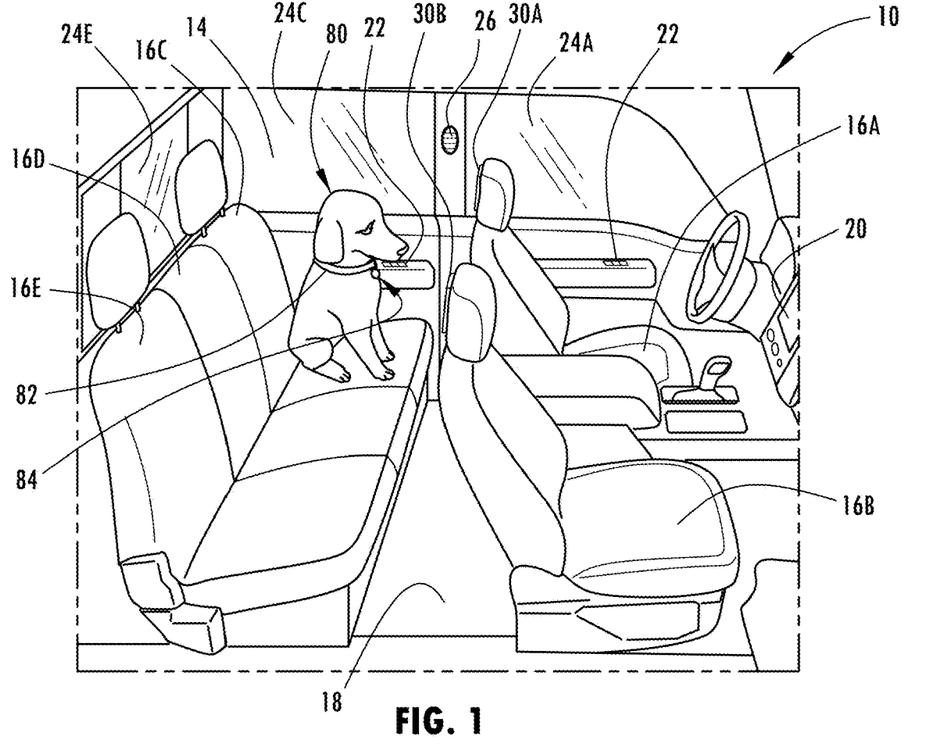
FIG. 1 is a side perspective view of a cabin interior of a vehicle containing a pet and having vehicle related controls, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to pet detection and related vehicle controls. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
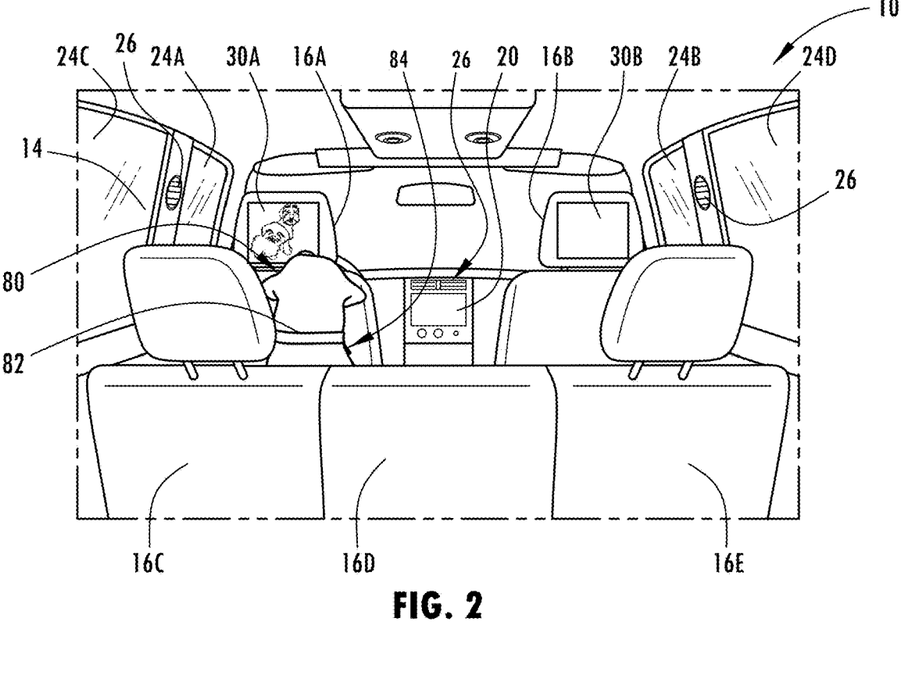
FIG. 2 is a forward looking rear view of the cabin interior of FIG. 1 further illustrating the pet seated in front of a display screen.
Figure 3:
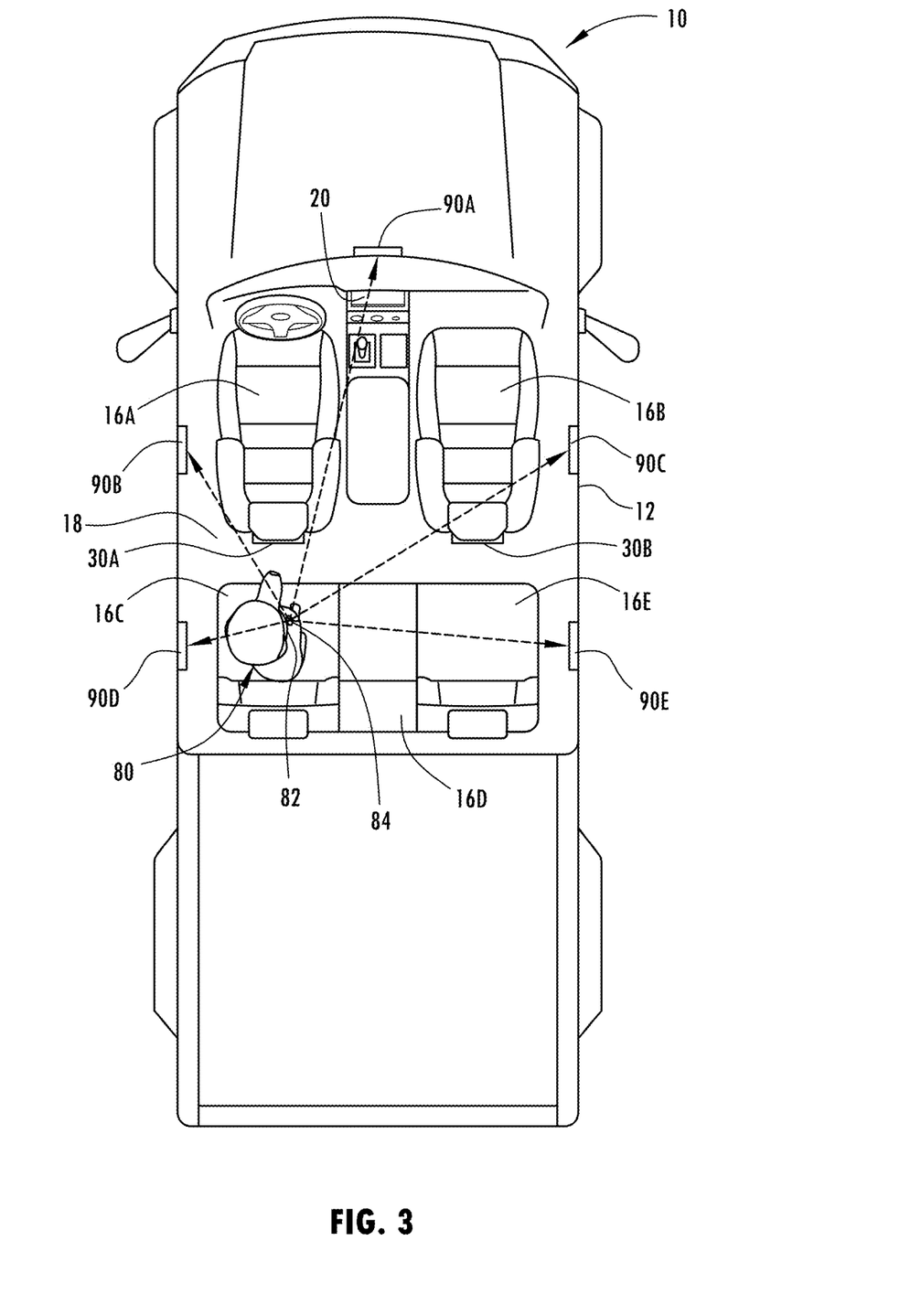
FIG. 3 is a top schematic view of the vehicle further illustrating the pet and exemplary vehicle related controls within the cabin interior.

Referring to FIGS. 1-3, the cabin interior 14 of a wheeled automotive or motor vehicle 10 is generally illustrated configured with passenger seating and accommodations for transporting living beings such as people and pets. The cabin interior 14 is generally defined by a vehicle body 12 and may contain various features and trim components within the vehicle body 12. The cabin interior 14 is shown having an arrangement of passenger seats including a first or front row of driver and passenger seats 16A and 16B and a second or rear row of three seats 16C-16E shown as bench or split bench seating. The vehicle may also possess additional rows as in the case of a large SUV, van or bus. The vehicle body 12 further defines a floor 18 upon which the seating is assembled. It should be appreciated that the vehicle 10 may be a motor vehicle, such as a wheeled car, truck, SUV, van or bus, for example, or an airplane, train, boat or other vehicle.

The vehicle 10 is further shown containing a pet, such as a dog, shown sitting on one of the rear seats for travel as a passenger within the cabin interior 14 of the vehicle 10. It should be appreciated that the vehicle 10 may transport any of a number of living beings, including one or more pets such as dogs and cats, for example. The pet 80 is shown wearing a collar 82 which is equipped with a radio frequency (RF) transmitter 84. It should be appreciated that the pet 80 may be positioned at any of a number of locations within the cabin interior 14 of the vehicle 10. Depending on the location of the pet 80 within the cabin interior 14, any of a number of vehicle related functions may be controlled. For example, if the pet 80 is seated proximate to and in a viewing position of a rear display screen 30A or 30B, one or more characteristics of the rear display screen may be adjusted. For example, the frame rate or resolution of the video images displayed on the display screen 30A or 30B may be adjusted to provide for an increased frame rate that is more suitable for a pet, such as a dog, as compared to a preferred lower frame rate for a human being. Additionally, the color of the video images displayed on the display screen 30A or 30B may be changed from black and white for a pet whereas a human being may be presented with a broad full range spectrum of colors.

Additionally, the one or more of the windows 24A-24E on the vehicle 10 may be adjusted based on the determined position of the pet 80. The vehicle 10 is equipped with a number of windows 24A-24E that are adjustable to move down and up between the open and closed positions. Included in this example are front seating row left and right side windows 24A and 24B and rear seating left and right side windows 24C and 24D. In addition, a rear window 24E, such as a sideways sliding window is shown located centrally behind the rear row of seating. If the pet 80 is determined to be located proximate to one of the rear windows 24C or 24D, the corresponding rear window 24C or 24D may be controlled to move to an open position, such as a partial open position, to accommodate the pet 80. At the same time, the rear window 24E may be opened to allow for enhanced airflow within the cabin interior 14 proximate to the pet 80 and reduced window throb. Similarly, if the pet is located proximate to one of the front row windows 24A or 24D, the corresponding front row window may be moved to a desired position.

It should be appreciated that the airflow within the interior cabin 14 of the vehicle 10 may be otherwise changed to accommodate the location of the pet 80. For example, one or more air ducts 26 may be controlled to provide a controlled amount of airflow to the pet 80 depending on the location of the pet 80. This may include controlling the amount and directivity of airflow exiting the air ducts 26. Also, it should be appreciated that blowers may be employed, particularly at low vehicle speed to blow air via the vent onto the pet 80 at an increased airflow rate and at high vehicle speeds when the windows may be closed more than at lower speeds.

Further, the seats 16A-16E may each be equipped with heaters and/or coolers for heating and/or cooling the corresponding seats. The heaters and coolers may be adjusted based on the location of the pet 80 to heat or cool the pet seated at a particular location on one of the seats. The heaters and coolers may be controlled based on the sensed temperature of the pet 80, in addition to the detected location of the pet 80. If the pet 80 has a higher than normal temperature, the seat coolers may be used to cool the pet 80. If the pet 80 has a lower than normal temperature, the seat heaters may be used to heat the pet 80.

As seen in FIG. 3, the vehicle 10 is configured to include a plurality of RF receivers 90A-90E positioned at different locations on board the vehicle 10. In the example shown, the vehicle 10 is equipped with five (5) RF receivers 90A-90E, however, it should be appreciated that any number of RF receivers may be employed. The RF receivers 90A-90E each may receive RF signals transmitted by one or more RF transmitters including the RF transmitter 84 located on the collar 82 of the pet 80. The RF receivers 90A-90E may be configured as RF transceivers which may allow for the transmission and reception of RF signals. As such, RF transceivers may receive the RF transmit signals from the RF transmitter 84 and may further transmit signals to other communication devices on board or off board the vehicle 10.

The RF transmitter 84 may be configured as an RF transceiver that both transmit and receive RF signals. The RF transmitter 84 may use Bluetooth® low energy (BLE) commonly operating in 2.4 GHz ISM band (Industrial Scientific and Medical) and used for wireless personal area networks, according to one example. According to another example, the RF transmitter 84 may use an Ultra Wide-Band (UWB) protocol which may operate in the 6-8 GHz band. With both BLE or UWB, the system may employ the use of Round Trip Time (RTT) Time of Flight (ToF) to establish the pet collar location through triangulation or other methods such as Angle-of-Arrival (AoA), Received Signal Strength Indication (RSSI), Phase or other method. Further, other technologies may be used such as low frequency (i.e., 125-134 kHz) RSSI or acoustic or ultrasonic sound.

As seen in FIG. 3, the RF transmitter 84 located on the pet 80 transmits a low energy RF signal that may be received by each of the five RF receivers 90A-90E. RF receiver 90A is shown located at a position generally at the forward end of the cabin interior 14, RF receivers 90B and 90C are shown located on opposite left and right lateral sides of the front row of seating, and RF receivers 90D and 90E are shown located on opposite left and right lateral sides of the second row of seating. As such, each of the RF receivers 90A-90E is located in a different location separated from the other RF receivers 90A-90E. The RF signal transmitted from the RF transmitter 84 is received by each of the RF receivers 90A-90E and is processed to determine a location of the pet 80. According to one embodiment, this may be achieved by processing the received signal strength or amplitude of the RF signal received at each of the RF receivers 90A-90E and determining via triangulation a geographic location of the pet 80. By determining the amplitude of the RF signal received by each RF receivers 90A-90E, the distance from each RF receiver to the RF transmitter can be determined. Given the relative location to each RF receiver, the location of the RF transmitter transmitting the processed signal can be determined using triangulation.

Figure 4:
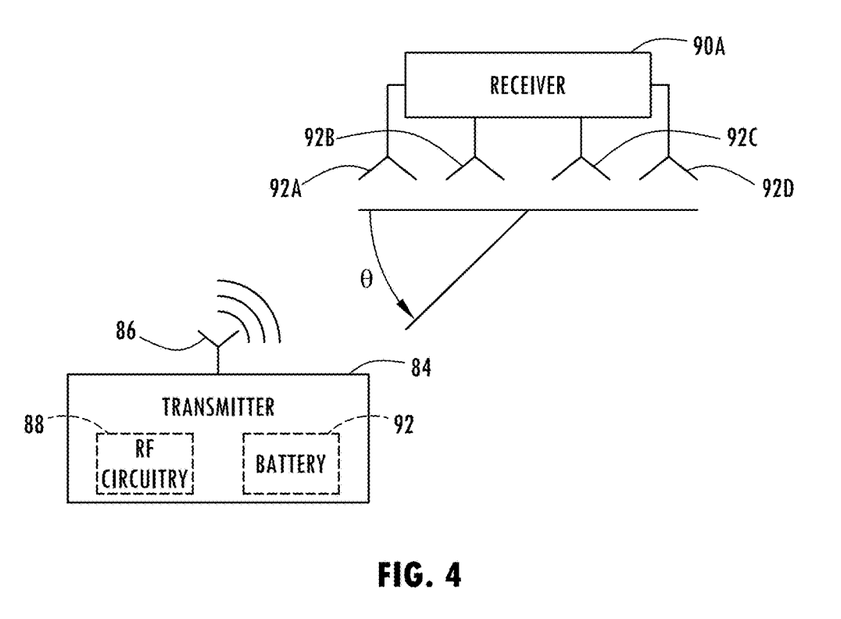
FIG. 4 is a schematic view of an RF transmitter communicating with an RF receiver to track location of the RF transmitter, according to one example.

According to another embodiment, the RF receivers 90A-90E may include a plurality of antennas that further enable determination of an approximate angle θ of arrival as shown in FIG. 4 to provide enhanced accuracy determination to the location of the RF transmitters 84 associated with the pet 80. In this embodiment, RF receiver 90A is shown having a plurality of antennas, shown as four antennas 92A-92D for receiving an RF signal transmit from the RF transmitter 84 with antenna 86 and determining an angle θ of arrival of the signal based on the arrangement of the plurality of antennas 92A-92D. The amplitude of the signal received at each of the RF receivers 90A-90E may further be processed to determine distance to each RF receivers and to determine an accurate position of the RF transmitter by using triangulation. RF receivers 90A-90E may likewise be configured as shown in FIG. 4. According to a further embodiment, the location of the RF transmitters may be determined based on a determined trip time of flight.

As such, the pet 80 may be monitored and the location of the RF transmitter 84 on the pet 80 determined by processing the RF signal received with the RF receivers 90A-90E with a controller. The driver and passengers in the vehicle 10 may be notified of the location of the pet 80 on a human machine interface (HMI), such as a vehicle display screen 20. The determined location of the pet 80 may also be used to control various functions on board the vehicle 10 and off the vehicle 10 such as controlling vehicle windows, vehicle seat temperature, heating, ventilation and cooling and the images displayed on a display screen, for example.

The RF transmitter 84 may include an antenna 86, RF circuitry 88, and an electrical power source in the form of a battery 92. While the RF transmitter 84 is shown located on the pet collar 82, it should be appreciated that the RF transmitter 84 may be located elsewhere on the pet 80 or an accessory associated with the pet 80 to provide a signal used to identify the location of the pet 80.

The RF transmitter 84 may be configured to only transmit when located in a vehicle or to transmit at a higher transmission rate when in a vehicle, so as to consume less battery power. The RF transmitter 84 can remain in a dormant state and can be prompted to an active state by the vehicle system or may transmit signals only on request so as to further conserve the battery power. For example, with the RF transmitter 84 configured as an RF transceiver, the RF transceiver may receive a signal prompting the RF transmitter portion of the transceiver to transmit signals upon request and may otherwise remain in the dormant state to thereby conserve battery power.

While the RF transmitter 84 is shown located on a pet collar 82 and the RF receivers 90A-90E are located on the vehicle 10, it should be appreciated that the RF transmitter 84 may be configured as an RF transceiver that may be located on either the pet collar 82 or the vehicle 10 and the plurality of RF receivers 90A-90E may be located on the other of the pet collar 82 and the vehicle 10, according to further embodiments.

Figure 5:
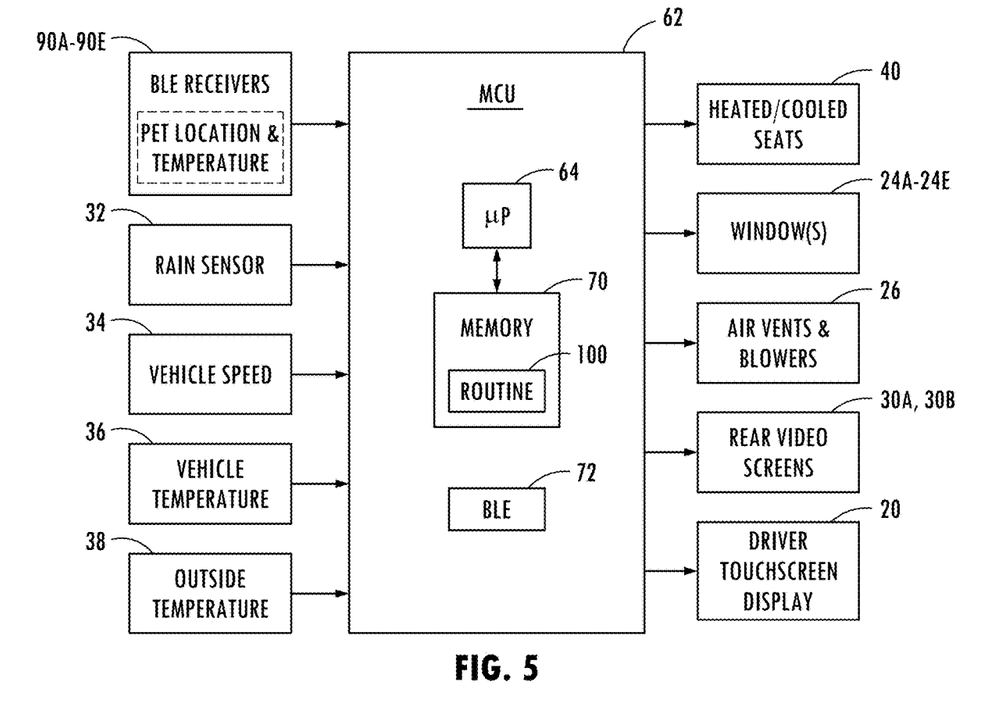
FIG. 5 is a block diagram illustrating a controller configured for controlling vehicle related functions based on the monitored pet.

Referring to FIG. 5, a controller 62 is shown for receiving various inputs and controlling various outputs depending upon the sensed location of the pet 80. The controller 62 is shown configured as a microcontrol unit (MCU) having a microprocessor 64 and memory 70. It should be appreciated that any analog and/or digital control circuitry may be employed as the controller 62. Stored within memory 70 and executed by microprocessor 64 are one or more control routines 100. Additionally, the controller 62 is shown having a wireless communication device 72, such as a Bluetooth® low energy device (BLE). The controller 62 receives various inputs made available on the vehicle 10 including received RF signals from the BLE receivers 90A-90E which may be processed to determine the location of the pet and temperature of the pet as detected by a temperature sensor on the pet collar 82 which may be communicated via the RF transmitter 84. Controller 62 may further include inputs from a rain sensor 32 on the vehicle indicative of whether the outside environment is experiencing rain and a vehicle speed sensor 34 indicative of the speed of travel of the vehicle. The inside vehicle temperature 36 and the outside vehicle temperature 38 may also be provided as inputs to the controller 62. Controller 62 processes the various inputs and controls various devices onboard the vehicle. For example, controller 62 may control one or more of the heated and/or cooled seats 40 associated with each of the seats on the vehicle. Additionally, the controller 62 may control one or more of the adjustable windows 24A-24E. Further, the controller 62 may control one or more air ducts and blowers 26 located on the vehicle. Further, the controller 62 may control one or more rear video screens 30A and 30B and may provide signals to and receive signals from a driver touchscreen display 20.

Figure 6:
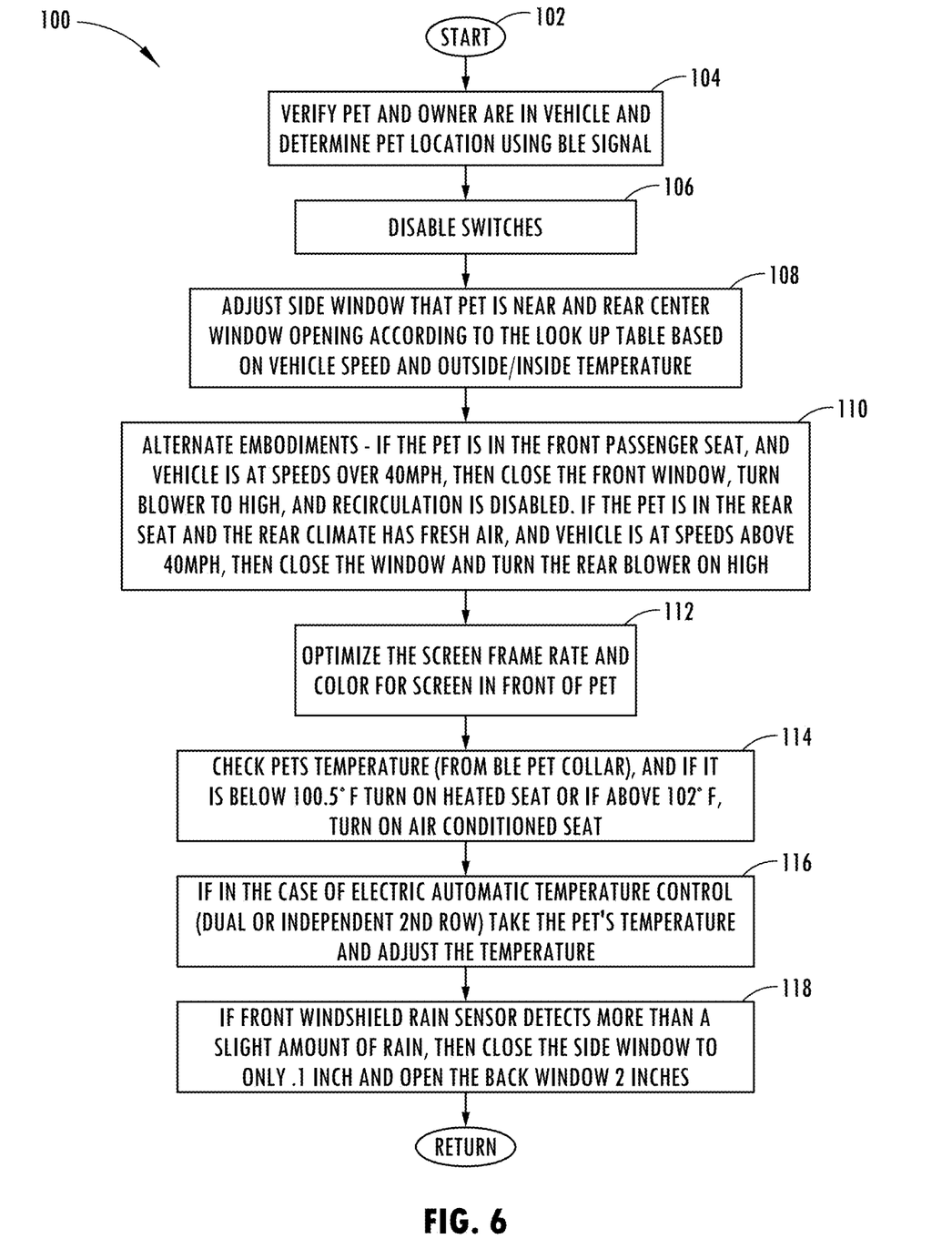
FIG. 6 is a flow diagram illustrating a control routine for controlling actions based on sensed parameters relating to the pet, according to one example.

Referring to FIG. 6, the control routine 100 for monitoring a pet and controlling vehicle features based on the pet is illustrated, according to one example. Routine 100 begins at step 102 and proceeds to step 104 to verify a pet and owner are located in the vehicle and to determine a location of the pet using the wireless RF signal transmitted by the RF transmitter attached to the pet. Next, at step 106, routine 100 will disable certain operator actuatable switches, such as the inside window controls and door locks located on the vehicle door. This will prevent a pet from accidentally actuating one or more of the switches when in the disabled state. Routine 100 then proceeds to step 108 to adjust a side window that the pet is located proximate to and a rear center window. The side window is controlled based on location of the pet. Both the side window and rear window may be controlled according to a lookup table based on the vehicle speed and the outside/inside temperatures. This may allow airflow to pass proximate to the pet which is a desired driving condition for many pets. In one alternate embodiment, when the pet is in the front passenger seat at speeds over a set speed, such as 40 mph, the front window proximate to the pet may be closed and a blower may be turned to a higher blow rate and recirculation of air may be disabled. If the pet is located in a rear seat in the second row or further rearward row of seating, the rear climate controls may provide fresh air when the speed is greater than 40 mph and may close the window and turn the rear blower on high.

If the pet is on the rear seat, then routine 100 may optimize the video display screen presented proximate to the pet at step 112. This may include adjusting the frame rate or resolution of the video display screen. For example, the video frame rate may be increased such as to 80 frames per second for a pet, whereas a human being typically prefers a lower frame rate such as 60 frames per second. Additionally, the color of the video display be changed to black and white color for a pet, as opposed to a broader spectrum of full colors which are more desirable to a human being.

Routine 100 then proceeds to step 114 to check the temperature of the pet which may be transmitted with the wireless RF signal received from the pet collar 82 and determines if the temperature of the pet is below a lower temperature threshold, such as 100.5° F. and, if so, turns on the heated seats to warm the pet. If the pet temperature is above a higher temperature threshold, such as 102° F., routine 100 turns on the air conditioned seat to cool the pet. As such, the heated and cooled seats may be adjusted to accommodate varying temperatures of the pet as needed.

Referring to step 116, routine 200 determines if in the case of an electronic automated temperature control (EATC) for dual or independent second row, the sensed temperature of the pet is acquired and sent to adjust the ambient temperature in the vehicle cabin. As such, the ambient temperature within the cabin interior can be increased when the pet has a low temperature and can be decreased when the pet has a high temperature. If a front windshield rain sensor detects more than a slight amount of rain, then routine 100 will close the side window to a small opening distance of within about 0.1 inch, for example, and may open the back window to a greater opening distance, such as 2 inches, according to one example.

Accordingly, the pet location and controls advantageously allow for monitoring of the location of the pet within a vehicle. Additionally, the vehicle controls enable certain controls to be initiated based on the determined pet location.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a vehicle body defining a cabin interior;
   a plurality of RF signal receivers located at a plurality of locations on the vehicle;
   an RF signal transmitter configured to be located on a pet for transmitting an RF signal; and
   a controller for processing the RF signal received by each of the plurality of RF signal receivers and determining a location of the pet within the cabin interior based on the received RF signal from each of the plurality of RF signal receivers, wherein the determined location is one location of a number of locations within the cabin interior relative to a seat position or a window.

2. The vehicle of claim 1, wherein the controller determines the location of the pet using triangulation and controls at least one vehicle function based on the sensed location of the pet.

3. The vehicle of claim 2, wherein the controller controls a video display based on an identified location of a pet positioned proximate to the video display.

4. The vehicle of claim 3, wherein the controller changes a characteristic of the video display.

5. The vehicle of claim 4, wherein the characteristic comprises a video frame rate.

6. The vehicle of claim 4, wherein the characteristic comprises color presented on images on the display.

7. The vehicle of claim 2, wherein the controller controls one or more windows of the vehicle based on the location of the pet.

8. The vehicle of claim 2, wherein the controller controls one or more heated and/or cooled seats to heat and/or cool the one or more seats based on the location of the pet.

9. The vehicle of claim 2, wherein the controller controls airflow within the vehicle from an air duct based on the location of the pet.

10. The vehicle of claim 9, wherein the controller controls one or more blowers to control the airflow in the air duct.

11. The vehicle of claim 2, wherein the controller controls ambient temperature in the vehicle based on a sensed temperature of the pet.

12. A vehicle comprising:
a vehicle body defining a cabin interior;
a plurality of RF signal receivers located at a plurality of locations on the vehicle;
an RF signal transmitter configured to be located on a pet for transmitting an RF signal; and
a controller for processing the RF signal received by each of the plurality of RF signal receivers and determining a location of the pet within the cabin interior based on the received RF signal from each of the plurality of RF signal receivers, wherein the determined location is one location of a number of locations within the cabin interior relative to a seat position or a window, and wherein the controller generates an output based on the location of the pet and controls at least one vehicle related function based on the output.

13. The vehicle of claim 12, wherein the controller controls a video display based on an identified location of a pet positioned proximate to the video display.

14. The vehicle of claim 13, wherein the controller changes a characteristic of the video display.

15. The vehicle of claim 14, wherein the characteristic comprises a video frame rate.

16. The vehicle of claim 14, wherein the characteristic comprises color of images presented on the display.

17. The vehicle of claim 12, wherein the controller controls one or more windows of the vehicle based on the location of the pet.

18. The vehicle of claim 12, wherein the controller processes the RF signal received from each of the plurality of the RF signal receivers and performs triangulation to determine the location of the pet.

19. The vehicle of claim 12, wherein the RF signal transmitter comprises a low energy wireless RF signal.

20. A vehicle comprising:
a vehicle body defining a cabin interior;
a plurality of first RF signal transceivers located at a plurality of locations on the vehicle for transmitting and receiving RF signals;
a second RF signal transceiver configured to be located on a pet for transmitting and receiving RF signals; and
a controller for processing the RF signals received by the plurality of first RF signal transceivers and the second RF signal transceiver and determining a location of the pet within the cabin interior based on the received RF signals, wherein the determined location is one location of a number of locations within the cabin interior relative to a seat position or a window.

* * * * *